United States Patent
Itoh et al.

(10) Patent No.: US 7,859,422 B2
(45) Date of Patent: Dec. 28, 2010

(54) SEAT SENSOR

(75) Inventors: Hiroyuki Itoh, Chita (JP); Yukihiro Saitoh, Chiryu (JP)

(73) Assignee: Denso Corporation, Kariya (JP)

( * ) Notice: Subject to any disclaimer, the term of this patent is extended or adjusted under 35 U.S.C. 154(b) by 479 days.

(21) Appl. No.: 11/983,950

(22) Filed: Nov. 13, 2007

(65) Prior Publication Data

US 2008/0122644 A1 May 29, 2008

(30) Foreign Application Priority Data

Nov. 28, 2006 (JP) ............................. 2006-320835

(51) Int. Cl.
*G08B 21/22* (2006.01)

(52) U.S. Cl. ................................................. 340/667

(58) Field of Classification Search .................. 340/667
See application file for complete search history.

(56) References Cited

U.S. PATENT DOCUMENTS

| 5,896,090 A * | 4/1999 | Okada et al. ................ 340/667 |
| 6,109,117 A | 8/2000 | Stanley et al. |
| 6,348,663 B1 * | 2/2002 | Schoos et al. ................ 177/144 |
| 6,366,200 B1 * | 4/2002 | Aoki .......................... 340/438 |
| 6,371,552 B1 * | 4/2002 | Narita et al. ............ 297/180.12 |
| 2003/0023414 A1 | 1/2003 | Lich et al. |
| 2005/0140210 A1 * | 6/2005 | Kojima et al. ............... 307/10.1 |
| 2007/0188181 A1 * | 8/2007 | Karges et al. ................ 324/691 |
| 2009/0003008 A1 * | 1/2009 | Ohtake et al. ............... 362/467 |

FOREIGN PATENT DOCUMENTS

| DE | 197 17 273 | 7/1998 |
| EP | 1 591 321 | 11/2005 |
| EP | 1591321 A2 * | 11/2005 |
| JP | 10-039045 | 2/1998 |
| JP | 2005-212496 | 8/2005 |
| JP | 2006-084356 | 3/2006 |

OTHER PUBLICATIONS

Office action dated Oct. 23, 2009 in corresponding German Application No. 10 2007 051825.2.
Office action dated Jun. 12, 2009 in corresponding Chinese Application No. 2007 10167366.8.
Office action dated Sep. 24, 2010 in corresponding Japanese Application No. 2006-320835.

* cited by examiner

*Primary Examiner*—George A Bugg
*Assistant Examiner*—Naomi Small
(74) *Attorney, Agent, or Firm*—Harness, Dickey & Pierce, PLC

(57) ABSTRACT

A seat sensor for a vehicle seat having a seat face portion includes a plurality of sensor cells. One of two electrodes of each sensor cell contacts an other one of the two electrodes to make the each of the plurality of sensor cells become electrically conductive when the each of the plurality of sensor cells is applied with a load. A first one of the plurality of sensor cells is displaced from a second one of the plurality of sensor cells in a longitudinal direction and in a transverse direction of the vehicle. One of the two electrodes of the second one of the plurality of sensor cells is directly and exclusively connected in series with one of the two electrode of the first one of the plurality of sensor cells.

12 Claims, 3 Drawing Sheets

SEAT SENSOR

CROSS REFERENCE TO RELATED APPLICATION

This application is based on and incorporates herein by reference Japanese Patent Application No. 2006-320835 filed on Nov. 28, 2006.

BACKGROUND OF THE INVENTION

1. Field of the Invention

The present invention relates to a seat sensor used for detecting that an occupant is seated on a vehicle seat and in particular, to a seat sensor including a sensor cell which becomes electrically conductive when the sensor cell is applied with a load of the occupant and so on.

2. Description of Related Art

JP10-39045A discloses a seat sensor, which is arranged in a seat face portion of a vehicle seat and is provided with plural sensor cells all connected in parallel. In this seat sensor, when one of the sensor cells turns on (becomes electrically conductive), it is determined that an occupant seats himself or herself (i.e., the occupant is seated) on the vehicle seat.

In this case, however, even when a baggage is placed on the vehicle seat, it may be erroneously detected that the occupant seats himself or herself on a vehicle seat because any of the sensor cells possibly turns on.

Therefore, JP2005-153556 corresponding to US No. 2005/0140210 discloses a seat sensor for solving this problem. This seat sensor is arranged in a seat face portion of a vehicle seat and is provided with two sensor cells which are arranged in a vehicle front side of the seat face portion and are connected in series with each other, and two sensor cells which are in a vehicle rear side of the seat face portion and are connected in series with each other. The two sensor cells arranged in the vehicle front side and the two sensor cells arranged in the vehicle rear side are connected in parallel with each other. According to the seat sensor, only when at least the two sensor cells arranged in the vehicle front side or the vehicle rear side turn on simultaneously, it is determined that the occupant seats himself or herself on the vehicle seat.

A baggage placed on a vehicle seat, for example, a handbag has an extremely small mass as compared to that of an occupant. Therefore, if the baggage is placed so that a force is exerted equally on a seat face portion of the vehicle seat, there is a slight possibility that a sensor cell turns on. However, if a baggage is placed in such a manner as to lean on a seat back rest portion of the vehicle seat, the baggage results in standing on its corner, possibly causing a large load to be applied on a specific position of the seat face portion. For example, there is a case where a large load is applied on the vehicle rear side of the seat face portion. In such a case, since the two sensor cells in the vehicle rear side simultaneously turn on even in the seat sensor disclosed in JP2005-153556A corresponding to US No. 2005/0140210, an erroneous detection due to the baggage possibly occurs.

SUMMARY OF THE INVENTION

The present invention is made in view of the above disadvantages. Thus, it is an objective of the present invention to address at least one of the above disadvantages.

To achieve the objective of the present invention, there is provided a seat sensor for a vehicle seat having a seat face portion, the seat sensor including a plurality of sensor cells. Each of the plurality of sensor cells is disposed to the seat face portion of the vehicle seat. The each of the plurality of sensor cells has two electrodes that are arranged to face with each other. One of the two electrodes contacts an other one of the two electrodes to make the each of the plurality of sensor cells become electrically conductive when the each of the plurality of sensor cells is applied with a load. A first one of the plurality of sensor cells is displaced from a second one of the plurality of sensor cells in a longitudinal direction of the vehicle and in a transverse direction of the vehicle. One of the two electrodes of the second one of the plurality of sensor cells is directly and exclusively connected in series with one of the two electrode of the first one of the plurality of sensor cells.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF PREFERRED EMBODIMENTS

First Embodiment

Embodiments of the present invention will be in detail explained with reference to the accompanying drawings. A seat sensor in the first embodiment will be explained with reference to FIGS. 1 to 4.

Figure 1:
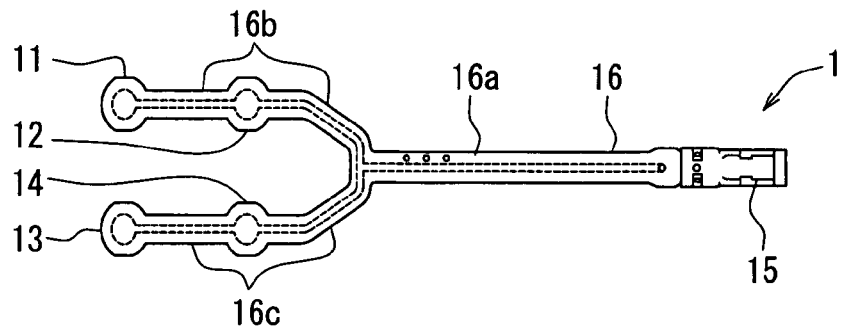
FIG. 1 is a plan view showing a seat sensor in a first embodiment of the present invention.

As shown in FIG. 1, a seat sensor 1 is constructed of four sensor cells 11, 12, 13, 14, a connector 15, and an electrical connection portion 16 for electrically connecting each sensor cell 11 to 14 and the connector 15. Each sensor cell 11 to 14 serves as a switch, which turns on (i.e., becomes electrically conductive) when it is subjected to a load from an occupant or a baggage. The connector 15 is provided with two terminals connected to the sensor cells 11 to 14 through the electrical connection portion 16 and is connected to an ECU (electronic control unit) for passenger detection mounted in a vehicle. In addition, the electrical connection portion 16 is constructed of a first electrical connection portion 16*a* formed so as to extend in one linear line from the connector 15 and second electrical connection portions 16b and 16c formed so as to bifurcate from an end portion of the first electrical connection portion 16a.

In addition, the sensor cells 11 and 12 respectively are arranged in an end portion and a central portion of one branched second electrical connection portion 16b and the sensor cells 13 and 14 respectively are arranged in an end portion and a central portion of the other branched second electrical connection portion 16c.

Figure 2:
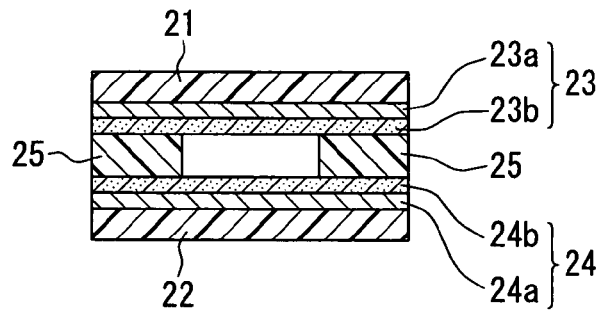
FIG. 2 is an enlarged cross section showing a sensor cell of the seat sensor in the first embodiment.

A detailed cross-sectional construction of the seat sensor 1 will be explained with reference to FIG. 2. As shown in FIG. 2, the seat sensor 1 is constructed of a first film 21, a second film 22, a first electrode 23, a second electrode 24 and a spacer 25. However, among the seat sensor 1, a portion of each sensor cell 11 to 14 and a portion of the electrical connection portion 16 are in common in a fundamental construction, but are a little different in a detailed construction from each other. Therefore, a difference between the configuration of each sensor cell 11 to 14 and the configuration of the electrical connection portion 16 will be explained for clarification.

The first film 21 constitutes a contour (i.e., an outer edge) of the sensor cells 11 to 14 and of the electrical connection portion 16, and is constructed of a linear portion corresponding to the first electrical connection portion 16a and a bifurcated portion corresponding to the sensor cells 11 to 14 and to the second electrical connection portions 16b and 16c. The first film 21 is made of a PEN resin and is formed in a thin shape. The first film 21 has a portion corresponding to each sensor cell 11 to 14, and the portion is formed in a generally circular shape. Also, the first film 21 has a portion corresponding to the electrical connection portion 16, and the portion is formed in a linear shape having a width smaller than a diameter of the circular shape of each sensor cell 11 to 14. In addition, the connector 15 is connected to a base end portion of the first film 21. The second film 22 is of the same material and in the same shape with the first film 21. The second film 22 is arranged so as to be opposed to the first film 21. In addition, a base end portion of the second film 22 is connected to the connector 15 in the same way with the first film 21.

The first electrode 23 is formed in one face (undersurface of the first film 21 in FIG. 2) of the first film 21. That is, the first electrode 23 is provided between the first film 21 and the second film 22 closely to the first film 21 (i.e., the first electrode 23 is arranged in an upward side in FIG. 2 between the first film 21 and the second film 22). This first electrode 23 is formed of a silver layer 23a adhering to the one face of the first film 21, and a carbon layer 23b coating a surface of the silver layer 23a. In addition, the first electrode 23 has a portion that corresponds to each sensor cell 11 to 14, and the portion is formed at least in the central portion of the first film 21 that has a circular shape. In addition, the first electrode 23 has another portion that corresponds to the electrical connection portion 16, and the portion is properly wired in accordance with a circuit to be formed.

The first electrode 24 is formed in one face of the second film 22 to oppose the first electrode 23 (upper surface of the second film 22 in FIG. 2). That is, the second electrode 24 is provided between the first film 21 and the second film 22 closely to the second film 22 (i.e., the second electrode 24 is provided between the first film 21 and the second film 22 in a downward side in FIG. 2). The second electrode 24 is formed of a silver layer 24a adhering to the one face of the second film 22, and of a carbon layer 24b coating a surface of the silver layer 24a. Further, the carbon layer 24b of the second electrode 24 is arranged to be spaced from the first electrode 23. In addition, the second electrode 24 has a portion that corresponds to each sensor cell 11 to 14, and the portion is formed at least in the central portion of the second film 22 that has a circular shape. That is, the portions of the first electrode 23 and the second electrode 24 corresponding to the sensor cells 11 to 14 are arranged as opposed to each other. In addition, the second electrode 24 has another portion that corresponds to the electrical connection portion 16, and the another portion is properly wired in accordance with a circuit to be formed. In other words, the portions of the first electrode 23 and the second electrode 24 corresponding to the electrical connection portion 16 provide electrical communication between (a) the portions of the first electrode 23 and the second electrode 24 corresponding to the sensor cells 11 to 14 and (b) the two terminals of the connector 15.

A contour of the spacer 25 is configured to have the same contour with each contour of the first film 21 and the second film 22. However, a passage is, as shown in a broken line in FIG. 1, formed in the central portion in the width direction of the spacer 25 over its entirety of the sensor cells 11 to 14 and the electrical connection portion 16. In more detail, a width of the passage at each of the sensor cells 11 to 14 is wider than a width of the passage at the electrical connection portion 16. This spacer 25 is made of a PET resin and is formed in a thin shape.

In addition, the spacer 25 is interposed between the first electrode 23 and the second electrode 24. That is, in FIG. 2, a space is surrounded and defined by the first electrode 23 and the second electrode 24 and the spacer 25. Here, since the width of the passage at each of the sensor cells 11 to 14 is, as described above, wider than the width of the passage at the electrical connection portion 16, a width of the corresponding space at each sensor cell 11 to 14 (width in the right and left directions in FIG. 2) is wider than a width of the corresponding space of the electrical connection portion 16. In consequence, when the wider space formed at each of the sensor cells 11 to 14 is subjected to (applied with) a compression load in the vertical direction in FIG. 2 (i.e., a direction perpendicular to the first film 21), the first film 21, the second film 22, the first electrode 23 and the second electrode 24 are deformed flexibly, so that the first electrode 23 contacts the second electrode 24 to provide electrical connection between the first electrode 23 and the second electrode 24. That is, each sensor cell 11 to 14 provides the electrical connection between the first electrode 23 and the second electrode 24 such that each sensor cell 11 to 14 becomes electrically conductive when each sensor cell 11 to 14 is applied with the compression load. Therefore, each sensor cell 11 to 14 serves as a switch. It should be noted that the corresponding space in the electrical connection portion 16 serves as a passage for air release. That is, the corresponding space in the electrical connection portion 16 serves for releasing inner air when the corresponding space in each sensor cell 11 to 14 is compressed.

Figure 3:
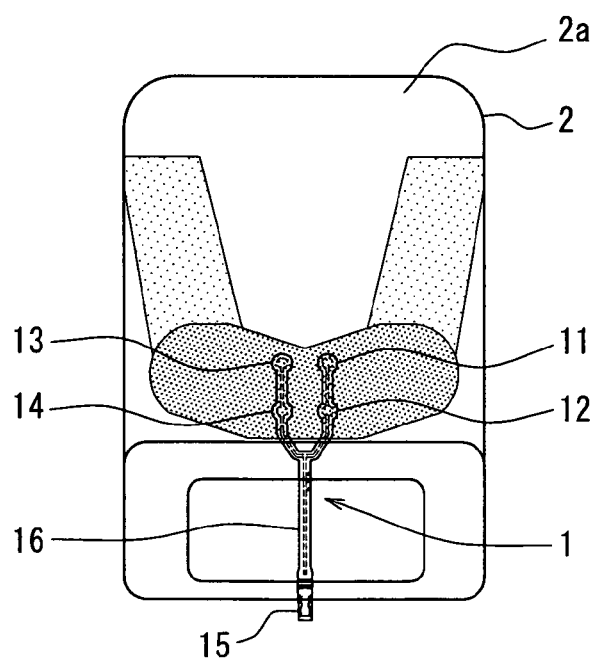
FIG. 3 is a plan view (viewed from a vehicle upward side) in a state of mounting the seat sensor in a vehicle seat in the first embodiment.

Next, a state of mounting the aforementioned seat sensor 1 in the vehicle seat 2 will be explained with reference to FIG. 3. Here, the shaded portion of the seat face portion 2a in FIG. 3 shows a range which receives a load when an occupant seats himself or herself on the vehicle seat 2. In particular, a darker portion in the shaded portion in FIG. 3 is an area corresponding to a hip part of the occupant, and the area receives more loads as compared to that of the lighter portion in the shaded portion in FIG. 3 corresponding to a femur of the occupant.

As shown in FIG. 3, the seat sensor 1 is mounted in the seat face portion 2a of the vehicle seat 2. In detail, the seat sensor 1 is arranged between a cushion of the seat face portion 2a and a surface layer thereof. In more detail, the sensor cells 11 to 14 of the seat sensor 1 are arranged in the central portion in the transverse direction of the vehicle at the vehicle rear side of the seat face portion 2a. That is, when an occupant seats himself or herself on the vehicle seat at the right posture, the sensor cells 11 to 14 of the seat sensor 1 are arranged at the hip part of the occupant. Accordingly when an occupant seats himself or herself on the vehicle seat 2 at the right posture (an appropriate posture), all of the sensor cells 11 to 14 become electrically conductive. In addition, the connector 15 is arranged to be positioned on the vehicle rear side of each sensor cell 11 to 14.

Figure 4:
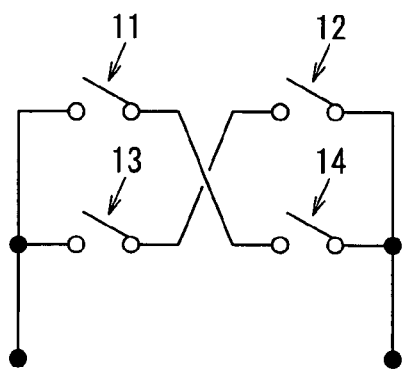
FIG. 4 is a circuit diagram of the seat sensor in the first embodiment.

Next, a circuit diagram of the seat sensor 1 will be explained with reference to FIG. 4. As shown in FIG. 4, the sensor cell 11 positioned at an end portion of one second electrical connection portion 16b is connected in series to the sensor cell 14 positioned at the central portion of the other second electrical connection portion 16c. In detail, either one of the first electrode 23 and the second electrode 24 formed at the sensor cell 11 is directly connected in series with only either one of the first electrode 23 and the second electrode 24 formed at the sensor cell 14. In other words, either one of the first electrode 23 and the second electrode 24 formed at the sensor cell 11 is directly and exclusively connected in series with either one of the first electrode 23 and the second electrode 24 formed at the sensor cell 14. The other of the first electrode 23 and the second electrode 24 formed at the sensor cell 11 and the other of the first electrode 23 and the second electrode 24 formed at the sensor cell 14 are directly connected to the respective two terminals of the connector 15. That is, the sensor cells 11 and 14 (constituting a first sensor cell group) are arranged such that the sensor cell 11 is displaced from the sensor cell 14 in the longitudinal direction (i.e., fore-and-aft direction) and the transverse direction (right-and-left direction) of the vehicle.

In addition, the sensor cell 12 positioned at a central portion of one second electrical connection portion 16b is connected in series with the sensor cell 13 positioned at an end portion of the other second electrical connection portion 16c. In detail, either one of the first electrode 23 and the second electrode 24 formed at the sensor cell 12 is directly and connected in series with only either one of the first electrode 23 and the second electrode 24 formed at the sensor cell 13. The other of the first electrode 23 and the second electrode 24 formed at the sensor cell 12 and the other of the first electrode 23 and the second electrode 24 formed at the sensor cell 13 are directly connected with the respective two terminals of the connector 15. That is, the sensor cells 12 and 13 (constituting the second sensor cell group) are arranged such that the sensor cell 12 is displaced from the sensor cell 13 in the longitudinal direction and the transverse direction of the vehicle.

Further, the first sensor cell group constructed of the sensor cells 11 and 14 is connected in parallel to the second sensor cell group constructed of the sensor cells 12 and 13. That is, when one of the first sensor cell group and the second sensor cell group is electrically connected with each other, the two terminals of the connector 15 are to be electrically connected with each other. Here, in the seat face portion 2a, a first line segment that connects the sensor cells 11 and 14 constituting the first sensor cell group is positioned to intersect with a second line segment that connects the sensor cells 12 and 13. In consequence, a parallel circuit of the first sensor cell group and the second sensor cell group can be constructed in a narrow region.

Next, an operation of the seat sensor 1 explained above will be explained. When an occupant seats himself or herself on the vehicle seat 2 at the right posture, the hip portion of the occupant presses all of the sensor cells 11 to 14 of the seat sensor 1. Accordingly, in this case, each of the sensor cells 11 to 14 becomes electrically conductive, and the two terminals of the connector 15 are to be electrically connected with each other. That is, the ECU for passenger detection connected to the connector 15 detects that the two terminals of the connector 15 are electrically connected with each other to determine that the occupant is seated.

In addition, even if an occupant does not seat himself or herself at the right posture, at least the first sensor cell group or the second sensor cell group is to be electrically conductive. Accordingly, even in this case, it is securely determined that an occupant seats himself or herself on the vehicle seat 2.

Here, the ECU for passenger detection turns on or flashes a warning lamp, for example, when an occupant seats himself or herself on the vehicle seat 2, but does not put on a seat belt. In addition, the occupant detection information detected by the ECU for passenger detection is transmitted to an air bag ECU for controlling activation of an occupant protection device, such as an air bag. In addition, in a case where it is determined that an occupant seats himself or herself on the vehicle seat 2, when a vehicle collides with an outside object, the air bag ECU activates the occupant protection device.

In addition, a case where a baggage is placed on the vehicle seat 2 is discussed. As described above, a state where the two terminals of the connector 15 in the seat sensor 1 are electrically connected with each other corresponds to a state where at least one of the first sensor cell group and the second sensor cell group is electrically conductive. That is, the corresponding state means any of (a) each of the sensor cell 11 and the sensor cell 14 is electrically conductive, of (b) each of the sensor cell 12 and the sensor cell 13 is electrically conductive, or of (c) each of the sensor cells 11 to 14 is electrically conductive.

Here, a state of a baggage placed on the vehicle seat 2 is discussed. For example, it is considered a case where a baggage such as a handbag is placed on the sensor cells 11 to 14 in the seat face portion 2a of the vehicle seat 2. At this point, when the baggage, which is lighter than an occupant, is placed in such a manner that a force is applied equally on the seat face portion 2a, the sensor cells 11 to 14 will not become electrically conductive. In consequence, the two terminals of the connector are not electrically connected with each other. That is, the ECU for passenger detection determines that the occupant does not seat himself or herself on the vehicle seat 2.

In addition, for example, when a baggage is placed on the seat face portion 2a in a state of leaning on the seat back rest portion of the vehicle seat 2, a large load may be applied in a specific, narrow point on the seat face portion 2a depending on a configuration or a size of the baggage. In this case, one of the sensor cells 11 to 14 may become electrically conductive. However, even when the one of the sensor cells 11 to 14 become conductive, the two terminals of the connector 15 will not be connected with each other as long as the other one of the sensor cells 11 to 14, which is connected in series with the one of the sensor cells 11 to 14, is not electrically conductive. Accordingly, in this case, the ECU for passenger detection determines that the occupant is not seated on the vehicle seat 2.

In addition, when a baggage is placed on the seat face portion 2a in a state of leaning on the seat back rest portion of the vehicle seat 2, a large load may be applied in a direction in parallel or perpendicular to the seat back rest portion of the vehicle seat 2. In this case, the large load may be applied in a linear shaped range of the seat face portion 2a, the linear shaped range extending in the transverse direction or the longitudinal direction of the vehicle. For example, when the large load is applied in the linear shaped range extending in the transverse direction of the vehicle on the seat face portion 2a, the sensor cells 11 and 13 positioned at the front side of the vehicle may exclusively become conductive. Alternatively, the sensor cells 12 and 14 positioned at the rear side of the vehicle may exclusively become conductive in this case. In addition, when the large load is applied in the linear shaped range extending in the longitudinal direction of the vehicle on the seat face portion 2a, the sensor cells 11 and 12 positioned at the right side of the vehicle may exclusively become conductive. Alternatively, the sensor cells 13 and 14 positioned at the left side of the vehicle may exclusively become conductive. In consequence, in any of the above cases, the first sensor cell group or the second sensor cell group is not electrically connected. That is, the ECU for passenger detection determines that an occupant is not seated on the vehicle seat 2.

Here, the sensor cells connected in series are arranged in a direction that is angled relative to the longitudinal direction of the vehicle. Accordingly, there is a little possibility that the baggage applies a large load in the angled direction. That is, an erroneous detection by the baggage can be securely limited.

Second Embodiment

Figure 5:
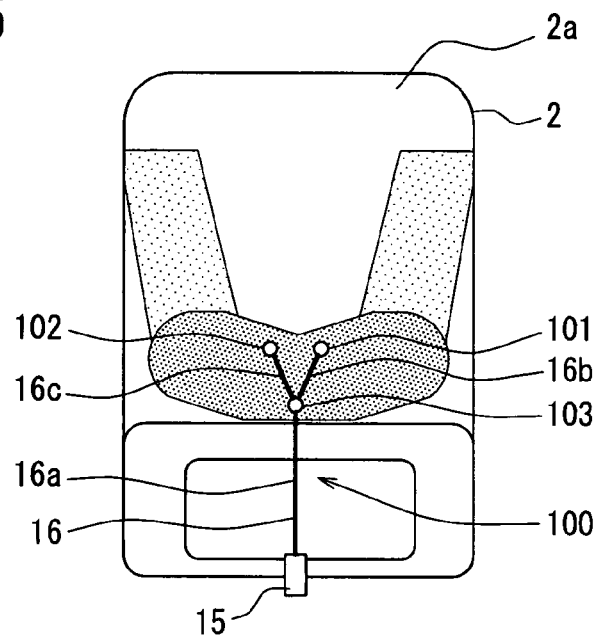
FIG. 5 is a plan view in a state of mounting a seat sensor in a vehicle seat in a second embodiment of the present invention.
Figure 6:
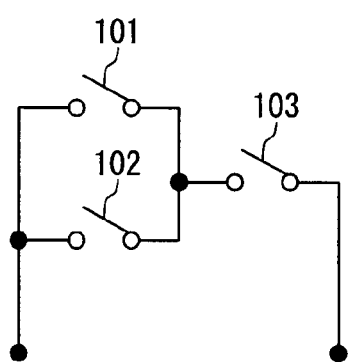
FIG. 6 is a circuit diagram of the seat sensor in the second embodiment.

Next, a seat sensor 100 in a second embodiment will be explained with reference to FIGS. 5 and 6. FIG. 5 is a plan view showing a state where the seat sensor 100 is mounted in the vehicle seat 2. FIG. 6 shows a circuit diagram of the seat sensor 100. It should be noted that components identical to those in the first embodiment are referred to as identical numbers and its explanation is omitted.

As shown in FIG. 5, the seat sensor 100 is constructed of three sensor cells 101, 102 and 103, the connector 15 and the electrical connection portion 16. A cross-sectional construction of the seat sensor 100 is the same as the cross-sectional construction of the seat sensor 1 in the first embodiment.

In addition, the sensor cell 101 is arranged at an end portion of one second electrical connection portion 16b that is branched from the electrical connection portion 16. The sensor cell 102 is arranged at an end portion of the other second electrical connection portion 16c that is also branched from the electrical connection portion 16. Thus, the one second electrical connection portion 16b and the other second electrical connection portion 16c are bifurcated part in the electrical connection portion 16.

Further, the seat sensor 100 is mounted in the seat face portion 2a of the vehicle seat 2. In detail, the seat sensor 100 is arranged between a cushion of the seat face portion 2a and a surface layer thereof. In more detail, the sensor cells 101 to 103 of the seat sensor 100 are arranged in the central portion in the transverse direction of the vehicle at the vehicle rear side of the seat face portion 2a. That is, the sensor cells 101 to 103 of the seat sensor 100 are arranged to correspond to the hip part of the occupant in a state where the occupant seats himself or herself on the vehicle seat 2 in the right posture. Accordingly when an occupant seats himself or herself on the vehicle seat 2 at the right posture, each of the sensor cells 101 to 103 becomes electrically conductive. In addition, the connector 15 is arranged to be positioned on the vehicle rear side of each sensor cell 101 to 103.

In addition, as shown in FIG. 6, the sensor cell 101 positioned at the end portion of the one second electrical connection portion 16b is connected in series with the sensor cell 103 positioned at a base end portion thereof. In detail, either one of the first electrode 23 and the second electrode 24 formed at the sensor cell 101 is directly and connected in series with only either one of the first electrode 23 and the second electrode 24 formed at the sensor cell 103. The other of the first electrode 23 and the second electrode 24 formed at the sensor cell 101 and the other of the first electrode 23 and the second electrode 24 formed at the sensor cell 103 are directly connected with the respective two terminals of the connector 15. That is, the sensor cells 101 and 103 (constituting the first sensor cell group) are arranged such that the sensor cell 101 is displaced from the sensor cell 103 in the longitudinal direction and the transverse direction of the vehicle.

Further, the sensor cell 102 positioned at the end portion of the other second electrical connection portion 16c is connected in series with the sensor cell 103 positioned at a base end portion thereof. In detail, either one of the first electrode 23 and the second electrode 24 formed at the sensor cell 102 is directly connected in series with only either one of the first electrode 23 and the second electrode 24 formed at the sensor cell 103. The other of the first electrode 23 and the second electrode 24 formed at the sensor cell 102 and the other of the first electrode 23 and the second electrode 24 formed at the sensor cell 103 are directly connected with the respective two terminals of the connector 15. That is, the sensor cells 102 and 103 (constituting the second sensor cell group) are arranged such that the sensor cell 102 is displaced from the sensor cell 103 in the longitudinal direction and the transverse direction of the vehicle.

Further, the sensor cell 101 and the sensor cell 102 are connected in parallel. That is, the first sensor cell group constructed of the sensor cell 101 and the sensor cell 103 and the second sensor cell group constructed of the sensor cell 102 and the sensor cell 103 are connected in parallel. Accordingly, when at least one of the first sensor cell group and the second sensor cell group becomes electrically conductive, the two terminals of the connector 5 are electrically connected with each other.

The seat sensor 100 thus constructed can achieve the effect similar to that of the seat sensor 1 in the first embodiment.

Third Embodiment

Figure 7:
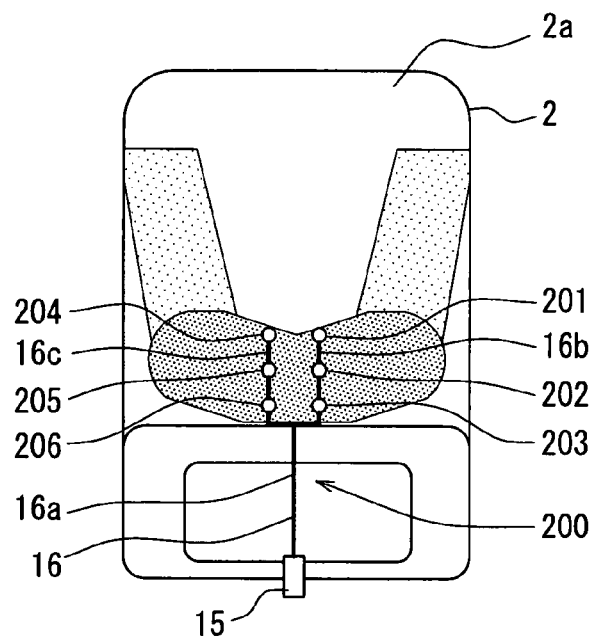
FIG. 7 is a plan view in a state of mounting a seat sensor in a vehicle seat in a third embodiment of the present invention.
Figure 8:
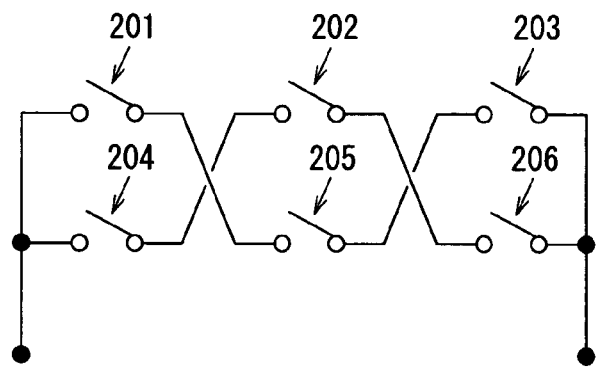
FIG. 8 is a circuit diagram of the seat sensor in the third embodiment.

Next, a seat sensor 200 in the third embodiment will be explained with reference to FIGS. 7 and 8. FIG. 7 is a plan view showing a state where the seat sensor 200 is mounted in the vehicle seat 2. FIG. 8 shows a circuit diagram of the seat sensor 200. It should be noted that components identical to those in the first embodiment are referred to as identical numbers and its explanation is omitted.

As shown in FIG. 7, the seat sensor 200 is constructed of six sensor cells 201, 202, 203, 204, 205, 206, the connector 15 and the electrical connection portion 16. A cross-sectional construction of the seat sensor 200 is the same as the cross-sectional construction of the seat sensor 1 in the first embodiment.

In addition, the sensor cell 201 is arranged at an end portion of one second electrical connection portion 16b branched from the electrical connection portion 16. The sensor cell 202 is arranged at a central portion of the one second electrical connection portion 16b. The sensor cell 203 is arranged at a base end portion of the one second electrical connection portion 16b. The sensor cell 204 is arranged at an end portion of the other second electrical connection portion 16c branched from the electrical connection portion 16. The sensor cell 205 is arranged at a central portion of the other second electrical connection portion 16c. The sensor cell 206 is arranged at a base end portion of the other second electrical connection portion 16c.

Further, the seat sensor 200 is mounted in the seat face portion 2a of the vehicle seat 2. In detail, the seat sensor 200 is arranged between a cushion of the seat face portion 2a and a surface layer thereof. In more detail, the sensor cells 201 to 206 of the seat sensor 200 are arranged in the central portion in the transverse direction of the vehicle at the vehicle rear side of the seat face portion 2a. That is, the sensor cells 201 to 206 of the seat sensor 200 are arranged to correspond to the hip part of the occupant in a state where the occupant seats himself or herself on the vehicle seat 2 in the right posture. Accordingly when the occupant seats himself or herself on the vehicle seat 2 in the right posture, each of the sensor cells

201 to 206 becomes conductive. In addition, the connector 15 is arranged to be positioned on the vehicle rear side of each sensor cell 201 to 206.

In addition, as shown in FIG. 8, the sensor cell 201, the sensor cell 203, and the sensor cell 205 positioned at a central portion of the other second electrical connection portion 16c are connected in series with each other. In detail, either one of the first electrode 23 and the second electrode 24 formed at the sensor cell 201 is directly connected in series with only either one of the first electrode 23 and the second electrode 24 formed at the sensor cell 205. The other one of the first electrode 23 and the second electrode 24 formed at the sensor cell 205 is directly connected in series with only either one of the first electrode 23 and the second electrode 24 formed at the sensor cell 203. In addition, the other one of the first electrode 23 and the second electrode 24 formed at the sensor cell 201 and the other one of the first electrode 23 and the second electrode 24 formed at the sensor cell 203 are directly connected to the respective terminals of the connector 15. That is, the sensor cells 201 and 205 are arranged such that the sensor cell 201 is displaced from the sensor cell 205 in the longitudinal direction and the transverse direction of the vehicle. The sensor cells 203 and 205 are also arranged such that the sensor cell 203 is displaced from the sensor cell 205 in the longitudinal direction and the transverse direction of the vehicle. Further, the sensor cells 201, 203 and 205 are not linearly positioned relative to each other. That is, the sensor cell 203 is displaced from an imaginary straight line that connects the sensor cells 201 and 205.

Further, the sensor cell 202, the sensor cell 204, and the sensor cell 206 are connected in series with each other. In detail, either one of the first electrode 23 and the second electrode 24 formed at the sensor cell 204 is directly connected in series with only either one of the first electrode 23 and the second electrode 24 formed at the sensor cell 202. The other one of the first electrode 23 and the second electrode 24 formed at the sensor cell 202 is directly connected in series with only either one of the first electrode 23 and the second electrode 24 formed at the sensor cell 206. In addition, the other one of the first electrode 23 and the second electrode 24 formed at the sensor cell 204 and the other one of the first electrode 23 and the second electrode 24 formed at the sensor cell 206 are directly connected with the respective terminals of the connector 15. That is, the sensor cells 204 and 202 are arranged such that the sensor cell 204 is displaced from the sensor cell 202 in the longitudinal direction and the transverse direction of the vehicle. The sensor cells 202 and 206 are also arranged such that the sensor cell 202 is displaced from the sensor cell 206 in the longitudinal direction and the transverse direction of the vehicle. Further, the sensor cells 202, 204 and 206 are not linearly positioned relative to each other. That is, the sensor cell 206 is displaced from an imaginary straight line that connects the sensor cells 202 and 204.

Further, the first sensor cell group constructed of the sensor cells 201, 205 and 203 and the second sensor cell group constructed of the sensor cells 204, 202 and 206 are connected in parallel to each other. That is, when either one of the first sensor cell group or the second sensor cell group turns on (i.e., becomes electrically conductive), the two terminals of the connector 15 are connected with each other.

The seat sensor 200 constructed in this way can also achieve the effect similar to that of the seat sensor 1 in the first embodiment. Further, the sensor cells 201, 205 and 203 constituting the first sensor cell group are not linearly arranged with each other. In addition, the sensor cells 204, 202 and 206 constituting the second sensor cell group are also not linearly arranged with each other. In consequence, the possibility that all the sensor cells of the first sensor cell group or all the sensor cells of the second sensor cell group are simultaneously made conductive due to a baggage is further reduced. That is, an error in detecting that an occupant seats himself or herself on the vehicle seat 2 caused by placing a baggage on the vehicle seat 2 can be more effectively limited.

It should be noted that in the first embodiment, an example of using four sensor cells 11 to 14 is explained, and in the third embodiment, an example of using six sensor cells 201 to 206 is explained. Besides, five, seven or further more sensor cells may be used. In addition, the present invention may be applied to a case of using two sensor cells. In the case, the two sensor cells are connected in series and are also arranged in the direction angled relative to the longitudinal direction of the vehicle. Further, each of the seat sensors 1, 100 and 200 is formed in a bifurcated shape, but may be formed in a trifurcated shape, a shape having four legs branched from the first electrical connection portion 16a or the like. In addition, the circuit construction is not limited to the two parallel circuits as described above, but may be constructed of three or more parallel circuits.

Figure 9:
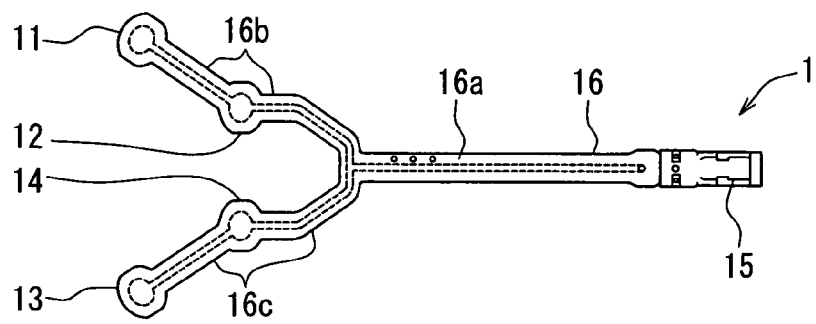
FIG. 9 is a plan view showing a seat sensor in a modification example of the present invention.

In the first embodiment, the second electrical connection portions 16b, 16c extend generally in parallel with each other. However, alternatively, the end portions of the second electrical connection portions 16b, 16c may be bent outwardly (i.e., bent away from each other) as shown in FIG. 9 such that a distance between the sensor cells 11, 13 at the ends of the second electrical connection portions 16b, 16c is larger than a distance between the sensor cells 12, 14 formed at center portions of the second electrical connection portions 16b, 16c.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A seat sensor for a vehicle seat having a seat face portion, the seat sensor comprising:

a plurality of sensor cells, each of which is disposed to the seat face portion of the vehicle seat, the each of the plurality of sensor cells having two electrodes that are arranged to face with each other, one of the two electrodes contacting an other one of the two electrodes to make the each of the plurality of sensor cells become electrically conductive when the each of the plurality of sensor cells is applied with a load, wherein:

a first one of the plurality of sensor cells is displaced from a second one of the plurality of sensor cells in a longitudinal direction of the vehicle and in a transverse direction of the vehicle;

one of the two electrodes of the second one of the plurality of sensor cells is directly and exclusively connected in series with one of the two electrodes of the first one of the plurality of sensor cells;

a third one of the plurality of sensor cells is displaced from the second one of the plurality of sensor cells in the longitudinal direction of the vehicle and in the transverse direction of the vehicle, the third one of the plurality of sensor cells being displaced from an imaginary straight line that connects the first one and the second one of the plurality of sensor cells; and an other one of the two electrodes of the second one of the plurality of sensor cells is directly and exclusively connected in series with one of the two electrodes of the third one of the plurality of sensor cells.

2. A seat sensor for a vehicle seat having a seat face portion, the seat sensor comprising:
- a plurality of sensor cells, each of which is disposed to the seat face portion of the vehicle seat, the each of the plurality of sensor cells having two electrodes that are arranged to face with each other, one of the two electrodes contacting an other one of the two electrodes to make the each of the plurality of sensor cells become electrically conductive when the each of the plurality of sensor cells is applied with a load, wherein:
- a first one of the plurality of sensor cells is displaced from a second one of the plurality of sensor cells in a longitudinal direction of the vehicle and in a transverse direction of the vehicle;
- one of the two electrodes of the second one of the plurality of sensor cells is directly and exclusively connected in series with one of the two electrodes of the first one of the plurality of sensor cells;
- the plurality of sensor cells includes three or more sensor cells, the seat sensor further comprising:
- a first sensor cell group including the first one and the second one of the plurality of sensor cells; and
- a second sensor cell group, wherein:
- the first sensor cell group is connected in parallel with the second sensor cell group;
- the second sensor cell group includes a third one and a fourth one of the plurality of sensor cells; and
- one of the two electrodes of the third one of the plurality of sensor cells is directly and exclusively connected in series with one of the two electrode of the fourth one of the plurality of sensor cells.

3. The seat sensor according to claim 2, wherein:
each sensor cell of the first sensor cell group is different from each sensor cell of the second sensor cell group.

4. The seat sensor according to claim 2, wherein:
- a first imaginary line segment connects the first one and the second one of the plurality of sensor cells of the first sensor cell group;
- a second imaginary line segment connects the third one and the fourth one of plurality of sensor cells of the second sensor cell group; and
- the first imaginary line segment intersects with the second imaginary line segment.

5. A seat sensor for a vehicle seat having a seat face portion, the seat sensor comprising:
- a plurality of sensor cells, each of which is disposed to the seat face portion of the vehicle seat, the each of the plurality of sensor cells having two electrodes that are arranged to face with each other, one of the two electrodes contacting an other one of the two electrodes to make the each of the plurality of sensor cells become electrically conductive when the each of the plurality of sensor cells is applied with a load, wherein:
- a first one of the plurality of sensor cells is displaced from a second one of the plurality of sensor cells in a longitudinal direction of the vehicle and in a transverse direction of the vehicle;
- one of the two electrodes of the second one of the plurality of sensor cells is directly and exclusively connected in series with one of the two electrode of the first one of the plurality of sensor cells; and
- the first one of the plurality of sensor cells and the second one of the plurality of sensor cells not being electrically connected in parallel with any of the plurality of sensor cells.

6. The seat sensor according to claim 5, wherein:
- a third one of the plurality of sensor cells is displaced from the second one of the plurality of sensor cells in the longitudinal direction of the vehicle and in the transverse direction of the vehicle, the third one of the plurality of sensor cells being displaced from an imaginary straight line that connects the first one and the second one of the plurality of sensor cells;
- an other one of the two electrodes of the second one of the plurality of sensor cells is directly and exclusively connected in series with one of the two electrodes of the third one of the plurality of sensor cells;
- the third one of the plurality of sensor cells not being in parallel with any of the plurality of sensor cells.

7. The seat sensor according to claim 5, wherein:
the plurality of sensor cells includes three or more sensor cells, the seat sensor further comprising:
- a first sensor cell group including the first one and the second one of the plurality of sensor cells; and
- a second sensor cell group, wherein:
the first sensor cell group is connected in parallel with the second sensor cell group.

8. The seat sensor according to claim 7, wherein:
- the second sensor cell group includes a third one and a fourth one of the plurality of sensor cells; and
- one of the two electrodes of the third one of the plurality of sensor cells is directly and exclusively connected in series with one of the two electrode of the fourth one of the plurality of sensor cells.

9. The seat sensor according to claim 8, wherein:
- a first imaginary line segment connects the first one and the second one of the plurality of sensor cells of the first sensor cell group;
- a second imaginary line segment connects the third one and the fourth one of plurality of sensor cells of the second sensor cell group; and
- the first imaginary line segment intersects with the second imaginary line segment.

10. The seat sensor according to claim 7, wherein:
- the second sensor cell group includes the first one and a third one of the plurality of sensor cells; and
- one of the two electrodes of the third one of the plurality of sensor cells is directly and exclusively connected in series with the one of the two electrode of the first one of the plurality of sensor cells.

11. The seat sensor according to claim 10, wherein:
- a first imaginary line segment connects the first one and the second one of the plurality of sensor cells of the first sensor cell group;
- a second imaginary line segment connects the first one and the third one of plurality of sensor cells of the second sensor cell group; and
- the first imaginary line segment intersects with the second imaginary line segment.

12. The seat sensor according to claim 7, wherein:
each sensor cell of the first sensor cell group is different from each sensor cell of the second sensor cell group.

* * * * *